United States Patent
Aoki et al.

(10) Patent No.: US 8,244,421 B2
(45) Date of Patent: Aug. 14, 2012

(54) VEHICLE AND CONTROL METHOD OF VEHICLE

(75) Inventors: Takanori Aoki, Nissin (JP); Koji Yamamoto, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 493 days.

(21) Appl. No.: 12/600,432

(22) PCT Filed: May 12, 2008

(86) PCT No.: PCT/JP2008/058705
§ 371 (c)(1),
(2), (4) Date: Nov. 16, 2009

(87) PCT Pub. No.: WO2008/143045
PCT Pub. Date: Nov. 27, 2008

(65) Prior Publication Data
US 2010/0152938 A1 Jun. 17, 2010

(30) Foreign Application Priority Data
May 15, 2007 (JP) ................................ 2007-129466

(51) Int. Cl.
*B60L 9/00* (2006.01)
(52) U.S. Cl. ...... 701/22; 903/905; 903/960; 180/65.285
(58) Field of Classification Search .................. 701/22; 903/905, 960; 180/65.285
See application file for complete search history.

(56) References Cited

U.S. PATENT DOCUMENTS

| 6,301,529 B1 | 10/2001 | Itoyama et al. |
| 2003/0172643 A1 | 9/2003 | Suzuki |
| 2009/0043476 A1* | 2/2009 | Saito et al. .................. 701/102 |

FOREIGN PATENT DOCUMENTS

| GB | 2 416 862 A | 8/2006 |
| JP | 11-173175 A | 6/1999 |
| JP | 2000-110604 A | 4/2000 |
| JP | 2000-297669 A | 10/2000 |
| JP | 2002-285883 A | 10/2002 |
| JP | 2004-364371 A | 12/2004 |
| JP | 2005-147050 A | 6/2005 |
| JP | 2005-261034 A | 9/2005 |
| JP | 2006-090150 A | 4/2006 |

OTHER PUBLICATIONS

Extended EP Search Report of EP 08752588.7 dated Apr. 13, 2011.

* cited by examiner

*Primary Examiner* — Thomas G. Black
*Assistant Examiner* — Luke Huynh
(74) *Attorney, Agent, or Firm* — Kenyon & Kenyon LLP

(57) ABSTRACT

When the low SOC control request is output and the catalyst warming request is not output, the low SOC control mode is set as a control mode and the state of charge (SOC) of the battery is controlled according to the managing center SOC* set as the smaller value S2 than the value S1 for the normal time. When the catalyst warming request is output, the catalyst warming mode is set as a control mode regardless of the low SOC control request and the engine is controlled to perform the self sustained operation (no-load operation) at the idling rotation speed Nidl with the spark-retard state. Namely, when the battery temperature is low and the catalyst temperature is also low, the catalyst warm-up is given a higher priority than the low SOC control and prevents the exhaust emission from becoming worse.

8 Claims, 11 Drawing Sheets

VEHICLE AND CONTROL METHOD OF VEHICLE

This is a 371 national phase application of PCT/JP2008/058705 filed 12 May 2008, claiming priority to Japanese Patent Application No. JP 2007-129466 filed 15 May 2007, the contents of which are incorporated herein by reference.

TECHNICAL FIELD

The present invention relates to a vehicle and a control method of the vehicle.

BACKGROUND ART

In a hybrid vehicle as a proposed vehicle, when a heating device in a passenger compartment is switched on and a cooling water temperature of an engine is less than a preset temperature, a target charge-discharge amount for charging a battery is set to a charge-discharge amount that makes the charge amount of the battery be less in comparison with the time when the cooling water temperature is not less than the preset temperature (see, for example, Patent Document 1). This control of the vehicle prevents a rapid increase of a remaining charge of the battery, applies a load from a motor to the engine for a relatively longer time, and accelerates heat generation of the engine.

Patent Document 1: Japanese Patent Laid-Open No. 2005-147050

DISCLOSURE OF THE INVENTION

In a hybrid vehicle, a battery is discharged with electric power required for outputting power from a motor in addition to output power from an engine when an accelerator pedal is largely stepped on, and the battery is charged through regeneration of kinetic energy of the vehicle at the motor to improve energy efficiency of the vehicle. For this reason, the battery supplying and receiving electric power to and from the motor is under control that a stored amount of electricity or state of charge (SOC) of the battery becomes within a managing range having its center as, for example, 60% or so of a storage capacity of the battery. In a case using a lithium-ion battery as the battery, when the battery temperature is low, the control to lower the managing range is executed and an allowable electric power for charging the battery is enlarged. This control enhances the energy efficiency of the vehicle and it is accordingly required to have the state of charge (SOC) of the battery low. In the hybrid vehicle, on the other hand, when a catalyst temperature of a exhaust purification device attached to an exhaust system of the engine is low, a no-load operation of the engine is performed to make the catalyst function sufficiently and an ignition timing of the engine is delayed to use more energy for warming up the catalyst. The vehicle is driven with output power from the motor during this engine operation, so that electric power needed until completion of the catalyst warm-up is to be ensured and it is accordingly required to have the state of charge (SOC) of the battery high. Therefore, when the battery temperature is low and the catalyst temperature of the exhaust purification device is low as well, it is to be decided which control is performed among the control to lower the state of charge (SOC) of the battery for enhancing the energy efficiency of the vehicle, the control to raise the state of charge (SOC) of the battery for warming up the catalyst, and the other control than the both control of the state of charge (SOC) of the battery.

In the vehicle of the invention and the control method of the vehicle, the main object of the invention is to more appropriately control a stored amount of electricity in an accumulator unit when a temperature of the accumulator unit such as a lithium-ion battery is low and a temperature of a catalyst of an exhaust purification device attached to an exhaust system of an internal combustion engine is also low.

In order to attain at least the above main object, the vehicle of the invention and the control method of the vehicle have the configurations discussed below.

According to one aspect, the present invention is directed to a vehicle. The vehicle has: an internal combustion engine with an exhaust system that an exhaust purification device having an exhaust purifying catalyst for purifying exhaust is attached; a generator that generates electric power using output power from the internal combustion engine; a motor that is capable of outputting power for driving the vehicle; an accumulator that supplies and receives electric power to and from the generator and the motor; a driving power demand setting module that sets a driving power demand required for driving the vehicle; a low charge state control requesting module that makes a request for low charge state control when at least a temperature of the accumulator is less than a first temperature, the low charge state control being control for managing a stored, amount of electricity in the accumulator using a stored amount center smaller than the stored amount center used when the temperature of the accumulator is not less than the first temperature, the stored amount center being a center of a managing range of the stored amount of electricity in the accumulator; a catalyst warming acceleration control requesting module that makes a request for catalyst warming acceleration control when at least a temperature of the exhaust purifying catalyst is less than a second temperature, the catalyst warming acceleration control being control for accelerating warm-up of the exhaust purifying catalyst; and a controller configured to, when the request for the low charge state control is made and the request for the catalyst warming acceleration control is not made, control the internal combustion engine, the generator, and the motor so that the stored amount of electricity in the accumulator is managed by the low charge state control and the vehicle is driven with a driving power corresponding to the set driving power demand, when the request for the low charge state control is not made and the request for the catalyst warming acceleration control is made, the controller controlling the internal combustion engine, the generator, and the motor so that the exhaust purifying catalyst is warmed up by the catalyst warming acceleration control and the vehicle is driven with the driving power corresponding to the set driving power demand, and when the request for the low charge state control is made and the request for the catalyst warming acceleration control is also made, the controller controlling the internal combustion engine, the generator, and the motor so that the exhaust purifying catalyst is warmed up by the catalyst warming acceleration control regardless of the request for the low charge state control and the vehicle is driven with the driving power corresponding to the set driving power demand.

The vehicle according to this aspect of the present invention, when the request for the low charge state control is made and the request for the catalyst warming acceleration control is not made, the internal combustion engine, the generator, and the motor are controlled so that the stored amount of electricity in the accumulator is managed by the low charge state control and the vehicle is driven with a driving power corresponding to the driving power demand required for driving the vehicle. The low charge state control, that is control for managing a stored amount of electricity in the accumulator using a stored amount center, that is a center of a managing range of the stored amount of electricity in the accumulator, smaller than the stored amount center used when the temperature of the accumulator is not less than the first temperature, is requested when a temperature of the accumulator is less than a first temperature. The catalyst warming acceleration control, that is control for accelerating warm-up of the exhaust purifying catalyst, is requested when a temperature of the exhaust purifying catalyst is less than a second temperature. This arrangement effectively enlarges an allowable electric power for charging the accumulator and enhances energy efficiency of the vehicle. In the vehicle of the invention, when the request for the low charge state control is not made and the request for the catalyst warming acceleration control is made, the internal combustion engine, the generator, and the motor are controlled so that the exhaust purifying catalyst is warmed up by the catalyst warming acceleration control and the vehicle is driven with the driving power corresponding to the driving power demand. This arrangement effectively enables rapid warm-up of the catalyst and prevents the exhaust emission from becoming worse. In the vehicle of the invention, when the request for the low charge state control is made and the request for the catalyst warming acceleration control is also made, the internal combustion engine, the generator, and the motor are controlled so that the exhaust purifying catalyst is warmed up by the catalyst warming acceleration control regardless of the request for the low charge state control and the vehicle is driven with the driving power corresponding to the driving power demand. Namely, the catalyst warming acceleration control is prioritized when both the low charge state control and the catalyst warming acceleration control are requested. This arrangement allows energy efficiency of the vehicle worsen a little but effectively enables rapid warm-up of the catalyst and prevents the exhaust emission from becoming worse. In the vehicle of the invention, the accumulator may be a lithium-ion battery.

In one preferable application of the vehicle according to the present invention, the catalyst warming acceleration control may be control that no load operation of the internal combustion engine is performed with delayed ignition timing from the ignition timing during performance of a load operation of the internal combustion engine. In another preferable application of the vehicle according to the present invention, the low charge state control requesting module may be a module that does not make the request for the low charge state control when a temperature of cooling water of the internal combustion engine is not less than a third temperature regardless of the temperature of the accumulator being less than the first temperature.

According to another aspect, the present invention is directed to a control method of a vehicle, the vehicle having: an internal combustion engine with an exhaust system that an exhaust purification device having an exhaust purifying catalyst for purifying exhaust is attached; a generator that generates electric power using output power from the internal combustion engine; a motor that is capable of outputting power for driving the vehicle; and an accumulator that supplies and receives electric power to and from the generator and the motor, the control method comprising the steps of: (a) making a request for low charge state control when at least a temperature of the accumulator is less than a first temperature, the low charge state control being control for managing a stored amount of electricity in the accumulator using a stored amount center smaller than the stored amount center used when the temperature of the accumulator is not less than the first temperature, the stored amount center being a center of a managing range of the stored amount of electricity in the accumulator, and making a request for catalyst warming acceleration control when at least a temperature of the exhaust purifying catalyst is less than a second temperature, the catalyst warming acceleration control being control for accelerating warm-up of the exhaust purifying catalyst; and (b) when the request for the low charge state control is made and the request for the catalyst warming acceleration control is not made, controlling the internal combustion engine, the generator, and the motor so that the stored amount of electricity in the accumulator is managed by the low charge state control and the vehicle is driven with a driving power corresponding to a driving power demand required for driving the vehicle, when the request for the low charge state control is not made and the request for the catalyst warming acceleration control is made, controlling the internal combustion engine, the generator, and the motor so that the exhaust purifying catalyst is warmed up by the catalyst warming acceleration control and the vehicle is driven with the driving power corresponding to the driving power demand, and when the request for the low charge state control is made and the request for the catalyst warming acceleration control is also made, controlling the internal combustion engine, the generator, and the motor so that the exhaust purifying catalyst is warmed up by the catalyst warming acceleration control regardless of the request for low charge state control and the vehicle is driven with the driving power corresponding to the driving power demand.

The control method of the vehicle according to this aspect of the present invention, when the request for the low charge state control is made and the request for the catalyst warming acceleration control is not made, the internal combustion engine, the generator, and the motor are controlled so that the stored amount of electricity in the accumulator is managed by the low charge state control and the vehicle is driven with a driving power corresponding to the driving power demand required for driving the vehicle. The low charge state control, that is control for managing a stored amount of electricity in the accumulator using a stored amount center, that is a center of a managing range of the stored amount of electricity in the accumulator, smaller than the stored amount center used when the temperature of the accumulator is not less than the first temperature, is requested when a temperature of the accumulator is less than a first temperature. The catalyst warming acceleration control, that is control for accelerating warm-up of the exhaust purifying catalyst, is requested when a temperature of the exhaust purifying catalyst is less than a second temperature. This arrangement effectively enlarges an allowable electric power for charging the accumulator and enhances energy efficiency of the vehicle. In the control method of the vehicle of the invention, when the request for the low charge state control is not made and the request for the catalyst warming acceleration control is made, the internal combustion engine, the generator, and the motor are controlled so that the exhaust purifying catalyst is warmed up by the catalyst warming acceleration control and the vehicle is driven with the driving power corresponding to the driving power demand. This arrangement effectively enables rapid warm-up of the catalyst and prevents the exhaust emission from becoming worse. In the control method of the vehicle of the invention, when the request for the low charge state control is made and the request for the catalyst warming acceleration control is also made, the internal combustion engine, the generator, and the motor are controlled so that the exhaust purifying catalyst is warmed up by the catalyst warming acceleration control regardless of the request for the low charge state control and the vehicle is driven with the driving power corresponding to the driving power demand. Namely, the catalyst warming acceleration control is prioritized when both the low charge state control and the catalyst warming acceleration control are requested. This arrangement allows energy efficiency of the vehicle worsen a little but effectively enables rapid warm-up of the catalyst and prevents the exhaust emission from becoming worse. In the control method of the vehicle of the invention, the accumulator may be a lithium-ion battery.

In one preferable application of, the control method of the vehicle according the present invention, the catalyst warming acceleration control may be control that no load operation of the internal combustion engine is performed with delayed ignition timing from the ignition timing during performance of a load operation of the internal combustion engine. In another preferable application of the control method of the vehicle according the present invention, the step (a) may be a step that does not make the request for the low charge state control when a temperature of cooling water of the internal combustion engine is not less than a third temperature regardless of the temperature of the accumulator being less than the first temperature.

BEST MODES OF CARRYING OUT THE INVENTION

Figure 1:
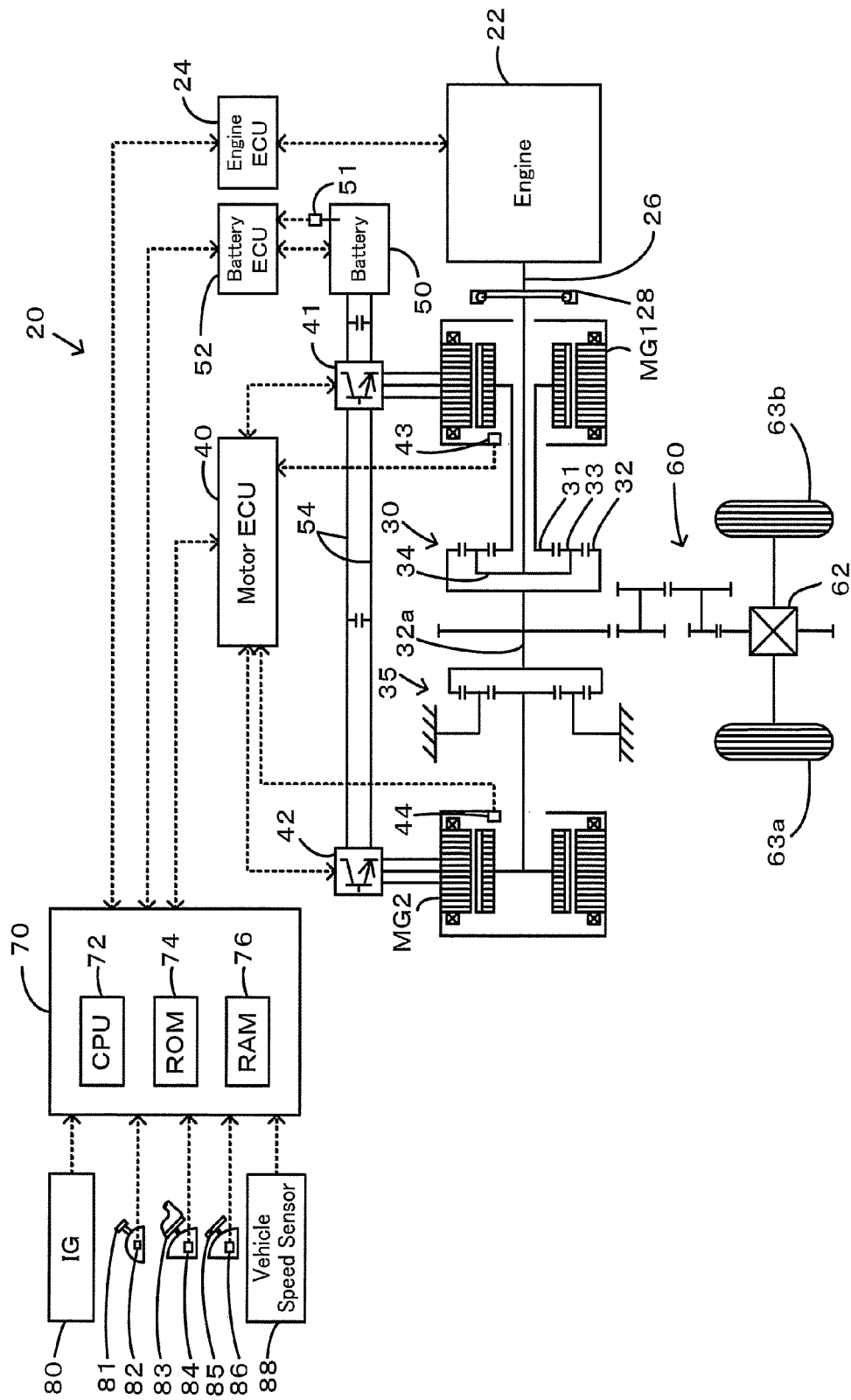
FIG. 1 is a schematic illustration of the configuration of a hybrid vehicle 20 in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20.

Figure 2:
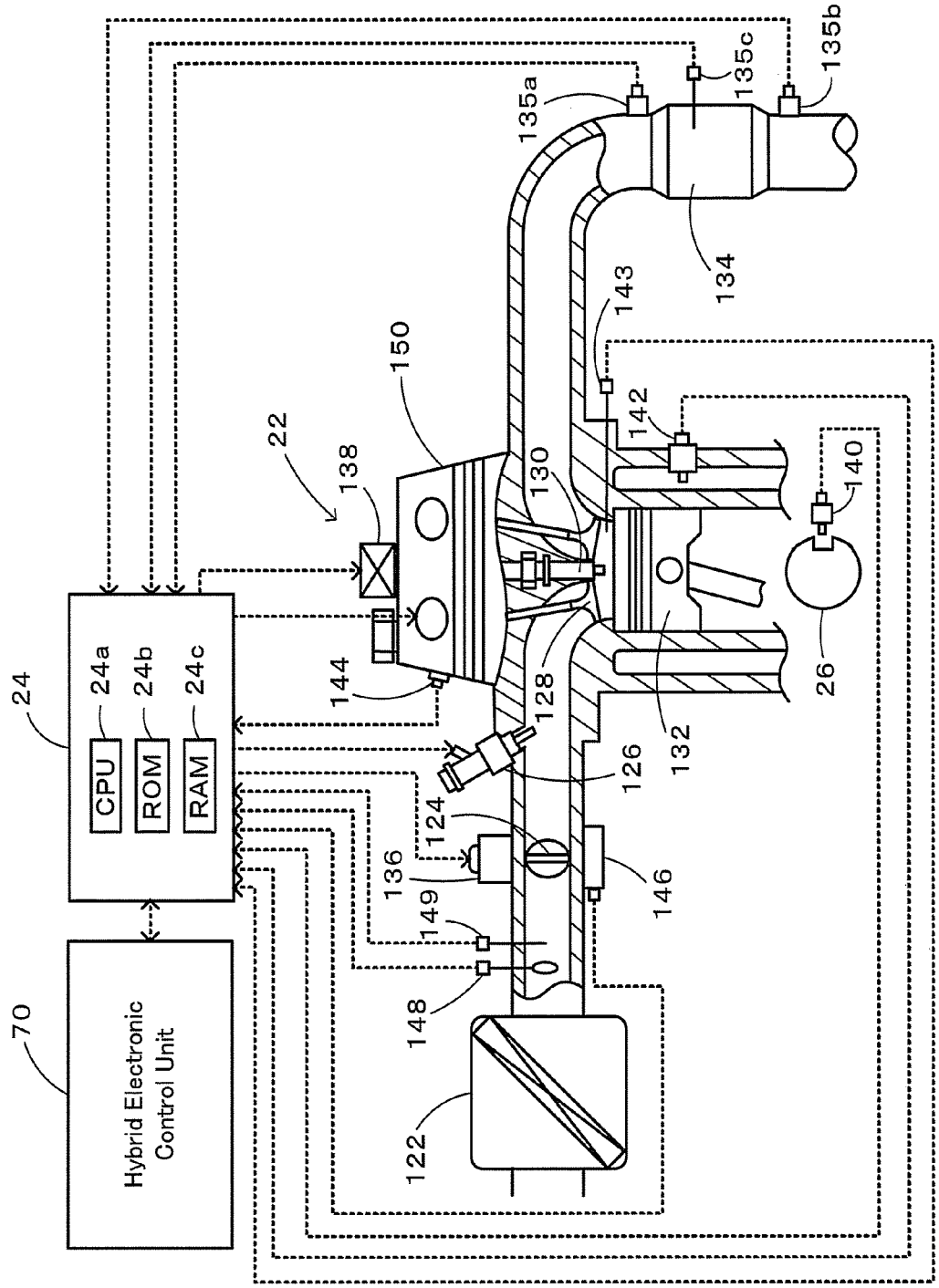
FIG. 2 is a schematic view showing the structure of an engine 22.

The engine 22 is an internal combustion engine that consumes a hydrocarbon fuel, such as gasoline or light oil, to output power. As shown in FIG. 2, the air cleaned by an air cleaner 122 and taken into an air intake conduit via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 pressed down by the combustion energy are converted into rotational motions of the crankshaft 26. The exhaust from the engine 22 goes through a catalytic converter (three-way catalyst) 134 to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit (hereafter referred to as engine ECU) 24. The engine ECU 24 is constructed as a microprocessor including a CPU 24a, a ROM 24b configured to store processing programs, a RAM 24c configured to temporarily store data, input and output ports (not shown), and a communication port (not shown). The engine ECU 24 receives, via its input port, signals from various sensors designed to measure and detect the operating conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located inside the combustion chamber, cam positions from a cam position sensor 144 detected as the rotational positions of camshafts driven to open and close the intake valve 128 and an exhaust valve for gas intake and exhaust into and from the combustion chamber, a throttle position from a throttle valve position sensor 146 detected as the position of the throttle valve 124, an air flow meter signal from an air flow meter 148 located in an air intake conduit, an intake air temperature from a temperature sensor 149 located in the air intake conduit, an air fuel ratio AF from an air-fuel ratio sensor 135a attached to the upstream side of the catalytic converter 134 of a exhaust system, an oxygen signal from an oxygen sensor 135*b* attached to the downstream side of the catalytic converter 134 of the exhaust system, and a catalyst temperature Tc from a temperature sensor 135*c* located in the catalytic converter 134. The engine ECU 24 outputs, via its output port, diverse control signals and driving signals to drive and control the engine 22. The signals output from the engine ECU 24 include driving signals to the fuel injection valve 126, driving signals to a throttle valve motor 136 driven to regulate the position of the throttle valve 124, control signals to an ignition coil 138 integrated with an igniter, and control signals to a variable valve timing mechanism 150 to vary the open and close timings of the intake valve 128. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements. The engine ECU 24 also performs an arithmetic operation to compute a rotation speed of the crankshaft 26 or a rotation speed Ne of the engine 22 from the crank position input from the crank position sensor 140.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the reduction gear 35 via ring gear shaft 32*a*. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63*a* and 63*b* via the gear mechanism 60, and the differential gear 62 from ring gear shaft 32*a*.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Figure 3:
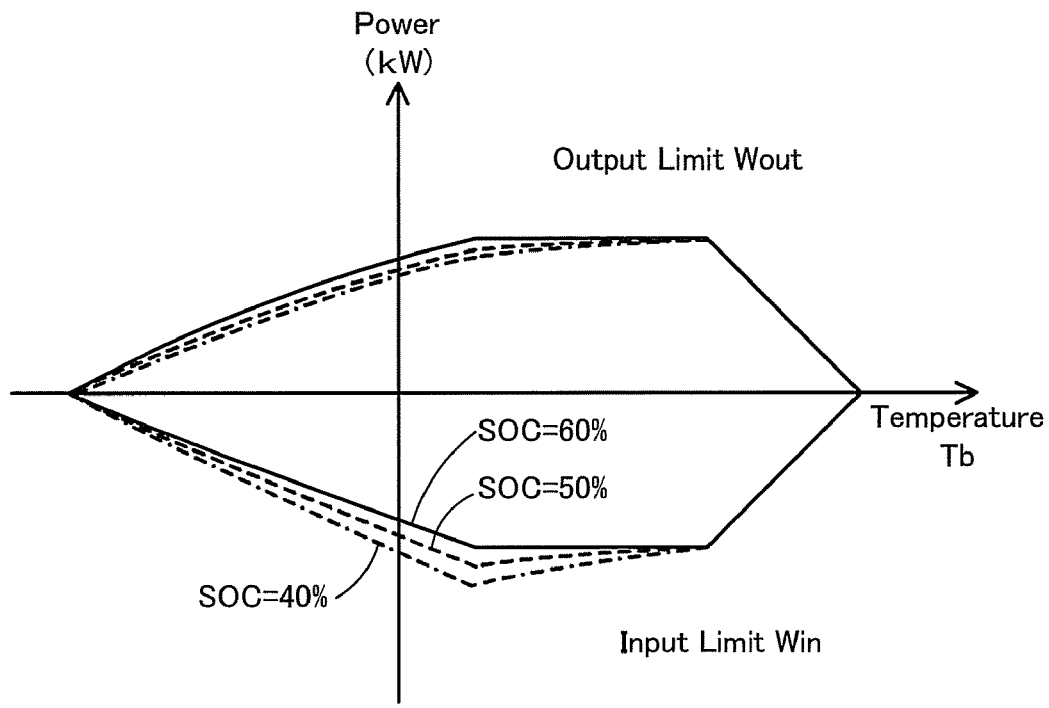
FIG. 3 shows variations of an input limit Win and an output limit Wout against the state of charge (SOC) and battery temperature Tb of a battery 50.
Figure 4:
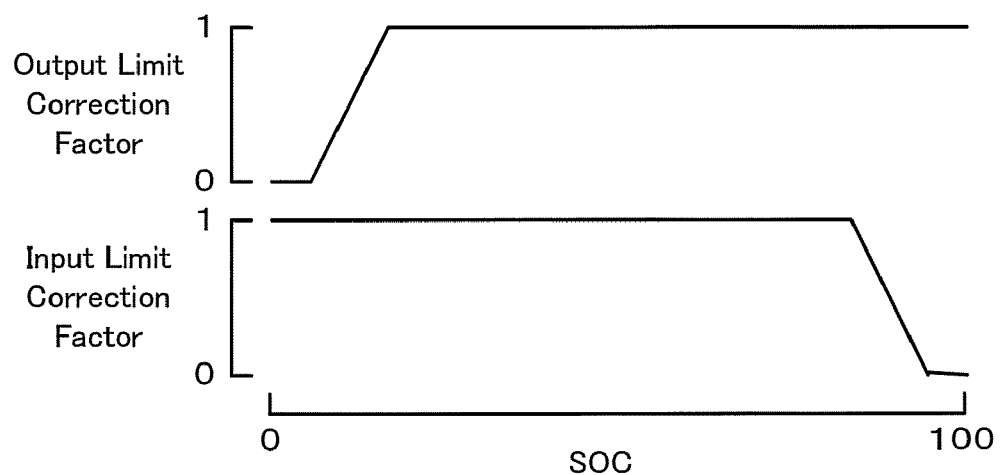
FIG. 4 shows variations of an input limit correction factor and an output limit correction factor against state of charge (SOC) of the battery 50.

The battery 50 is a lithium-ion battery under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A stored amount of electricity or state of charge (SOC) of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge (SOC) and the battery temperature Tb. A concrete procedure of setting the input and output limits Win and Wout of the battery 50 sets base values of the input limit Win and the output limit Wout corresponding to the state of charge (SOC) and the battery temperature Tb, specifies an input limit correction factor and an output limit correction factor corresponding to the state of charge (SOC) of the battery 50, and multiplies the base values of the input limit Win and the output limit Wout by the specified input limit correction factor and output limit correction factor to determine the input limit Win and the output limit Wout of the battery 50. FIG. 3 shows variations of the input limit Win and the output limit Wout against the state of charge (SOC) and the battery temperature Tb of the battery 50. FIG. 4 shows variations of the input limit correction factor and the output limit correction factor against the state of charge (SOC) of the battery 50. As illustrated in FIG. 3, the absolute value of the input limit Win is increased with an decrease in the state of charge (SOC) of the battery 50 in a lower range of the battery temperature Tb.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 5:
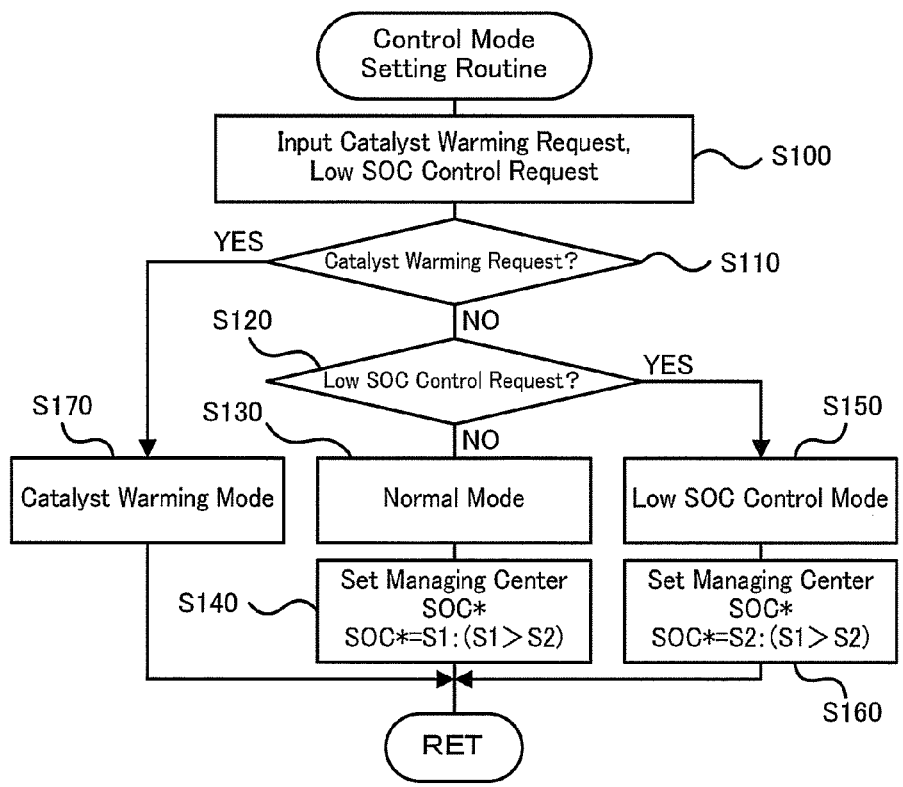
FIG. 5 is a flowchart showing a control mode setting routine executed by the hybrid electronic control unit 70 in the embodiment.
Figure 6:
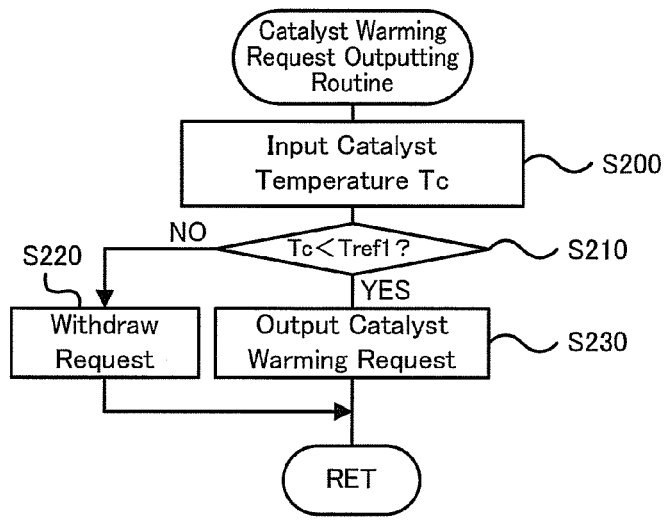
FIG. 6 is a flowchart showing an catalyst warming request outputting routine executed by the engine ECU 24 in the embodiment.

The description regards the operations of the hybrid vehicle 20 of the embodiment having the configuration discussed above. FIG. 5 is a flowchart showing a control mode setting routine repeatedly executed by the hybrid electronic control unit 70 in order to set a control mode for driving and controlling the engine 22 and motors MG1 and MG2. In the control mode setting routine, the CPU 72 of the hybrid electronic control unit 70 inputs whether a catalyst warming request is output or not and whether a low SOC control request is output or not. The catalyst warming request is made for executing a catalyst warming time drive control where the vehicle is driven while warming up the catalyst. The low SOC control request is made for executing a drive control while the state of charge (SOC) of the battery 50 is controlled to be low (step S100 to S120). When either of the catalyst warming request or the low SOC control request is not output, the CPU 72 sets a normal mode (step S130) and sets a managing center SOC* of the state of charge (SOC) of the battery 50 to a value S1 (for example, 60%) for a normal time (step S140), and this routine is terminated. When the catalyst warming request is not output but the low SOC control request is output, the CPU 72 sets a low SOC control mode (step S150) and sets the managing center SOC* of the state of charge (SOC) of the battery 50 to a smaller value S2 (for example, 45%) than the value S1 for the normal time (step S160), and this routine is terminated. When the catalyst warming request is output, the CPU 72 sets a catalyst warming mode regardless of the output of the low SOC control request (step S170), and this routine is terminated. The catalyst warming request is output with some possibility when the engine ECU 24 executes a catalyst warming request outputting routine shown in FIG. 6. In the catalyst warming request outputting routine, the engine ECU 24 inputs the catalyst temperature Tc of the catalytic converter 134 from the temperature sensor 135c (step S200), and compares the input catalyst temperature Tc with a reference value Tref1 that is set as a temperature lower than the lower limit of a temperature range where the catalyst is activated (step S210). When the catalyst temperature Tc is less than the reference value Tref1, the catalyst warming request is send to the hybrid electronic control unit 70 (step S230), and this routine is terminated.

Figure 7:
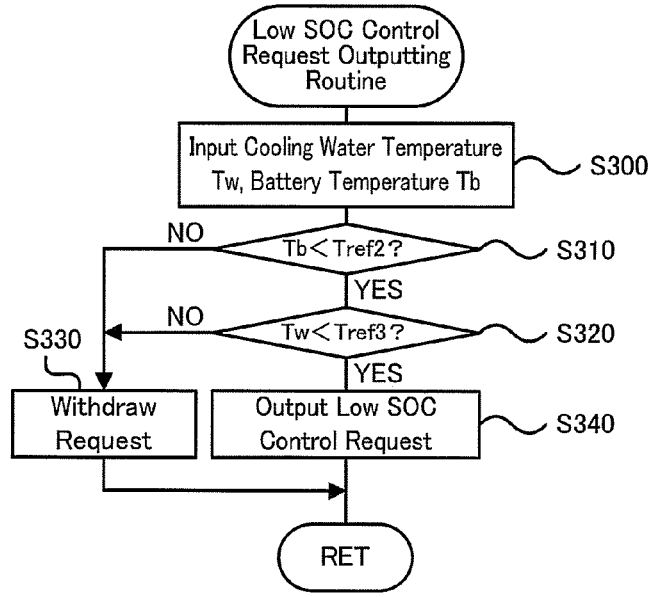
FIG. 7 is a flowchart showing an low SOC control request outputting routine executed by the battery ECU 52 in the embodiment.
Figure 8:
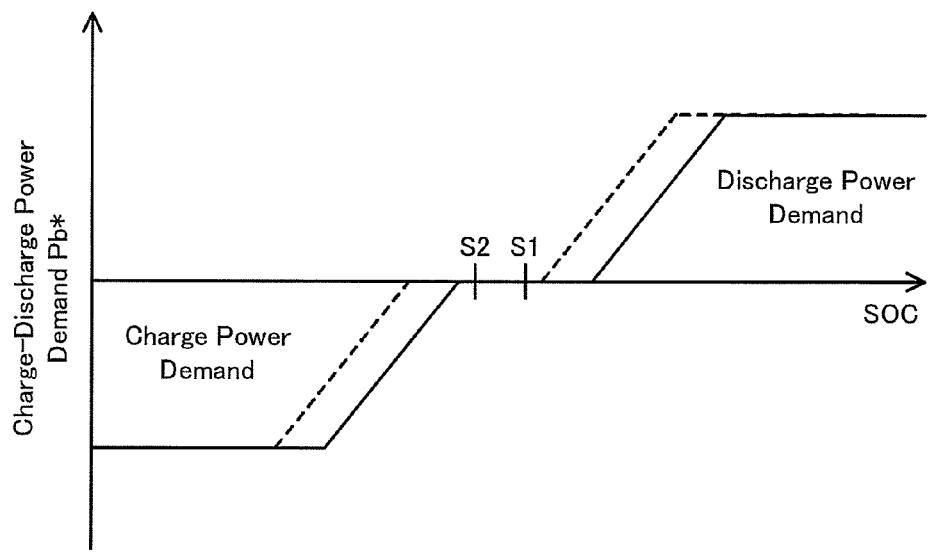
FIG. 8 shows variations of a charge-discharge power demand Pb* as a charge power demand or a discharge power demand against the state of charge (SOC) of the battery 50 with the managing center SOC*.

When the catalyst temperature Tc is not less than the reference value Tref1 and the catalyst warming request is currently made, the engine ECU 24 withdraws the request (step S220), and this routine is terminated. The low SOC control request is output with some possibility when the battery ECU 52 executes a low SOC control request outputting routine shown in FIG. 7. In the low SOC control request outputting routine, the battery ECU 52 inputs the cooling water temperature Tw of the engine 22 and the battery temperature Tb from the temperature sensor 51 (step S300), compares the battery temperature Tb with a reference value Tref2 that is set as a temperature (for example, 5° C. or 10° C.) where the absolute value of the input limit Win becomes small (step S310), and compares the cooling water temperature Tw with a reference value Tref3 that is set as a temperature (for example, 40° C.) where it is able to be determined that the engine 22 is not warmed up (step S320). When the battery temperature Tb is less than the reference value Tref2 and the cooling water temperature Tw is less than the reference value Tref3, the battery ECU 52 sends the low SOC control request to the hybrid electronic control unit 70 (step S340), and this routine is terminated. Either one of the time when the battery temperature Tb is not less than the reference value Tref2 and the time when the cooling water temperature Tw is not less than the reference value Tref3, the low SOC control request is withdrawn in the case that the request is currently made (step S330), and this routine is terminated. In this routine, the cooling water temperature Tw is detected by the water temperature sensor 142 and is input from the engine ECU 24 by communication. FIG. 8 shows variations of a charge-discharge power demand Pb* as a charge power demand or a discharge power demand against the state of charge (SOC) of the battery 50 with the managing center SOC*. In this figure, the solid line represents the case when the value S1 for the normal time is used as the managing center SOC*, and the broken line represents the case when the value S2 for the time of the low SOC control is used as the managing center SOC*. As shown in the figure, the smaller value S2 than the normal time value S1 is used as the managing center SOC* when executing the low SOC control, and the charge power demand and the discharge power demand shift to the lower SOC side from those at the normal time. Namely, in the low SOC control, the charge demand is output when the state of charge (SOC) is lower in comparison with the normal time, and the discharge demand is output when the state of charge (SOC) is lower in comparison with the normal time. This low SOC control enables to manage the state of charge (SOC) of the battery 50 to be low.

Figure 9:
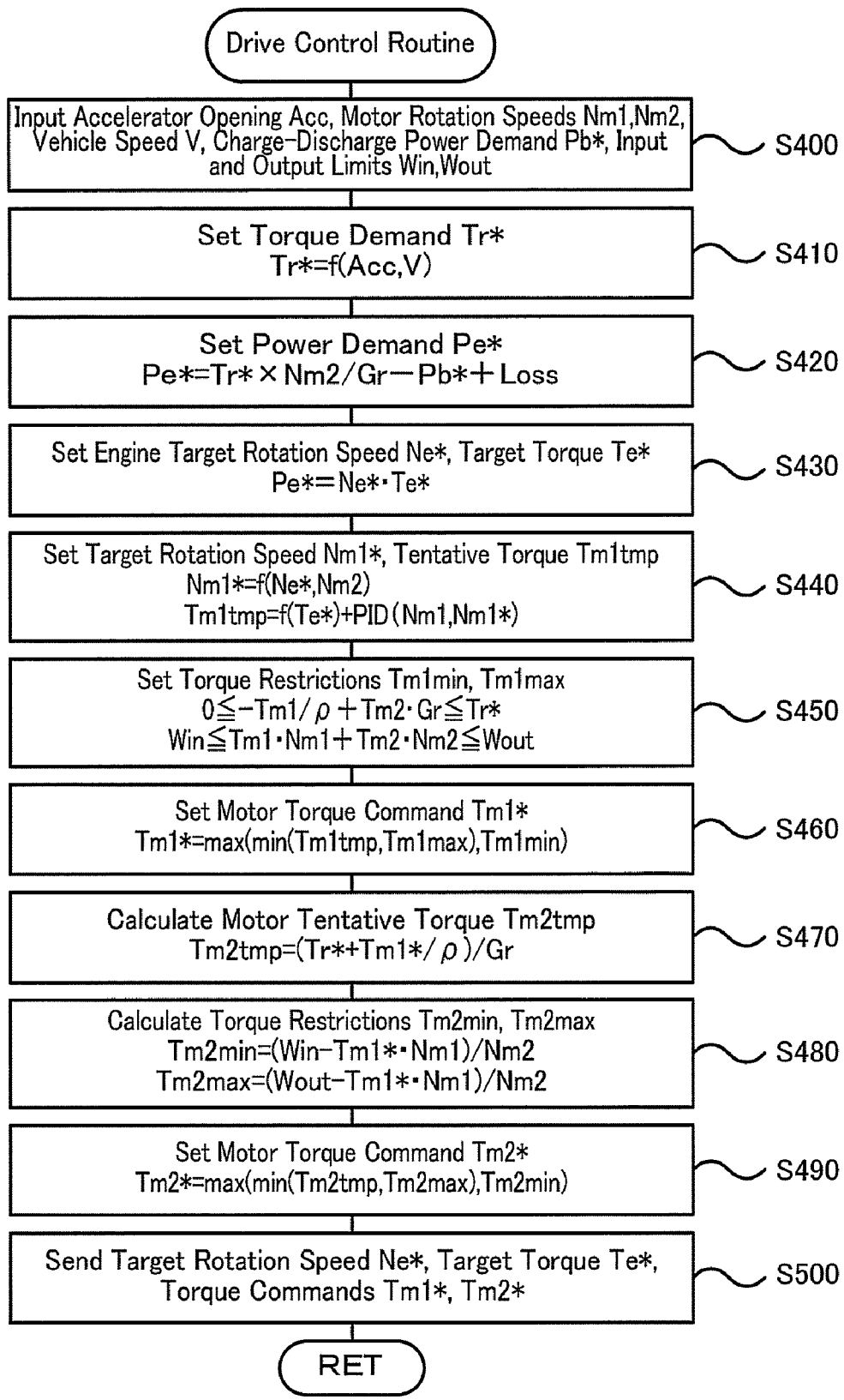
FIG. 9 is a flowchart showing a drive control routine executed by a hybrid electronic control unit 70 in the embodiment.
Figure 10:
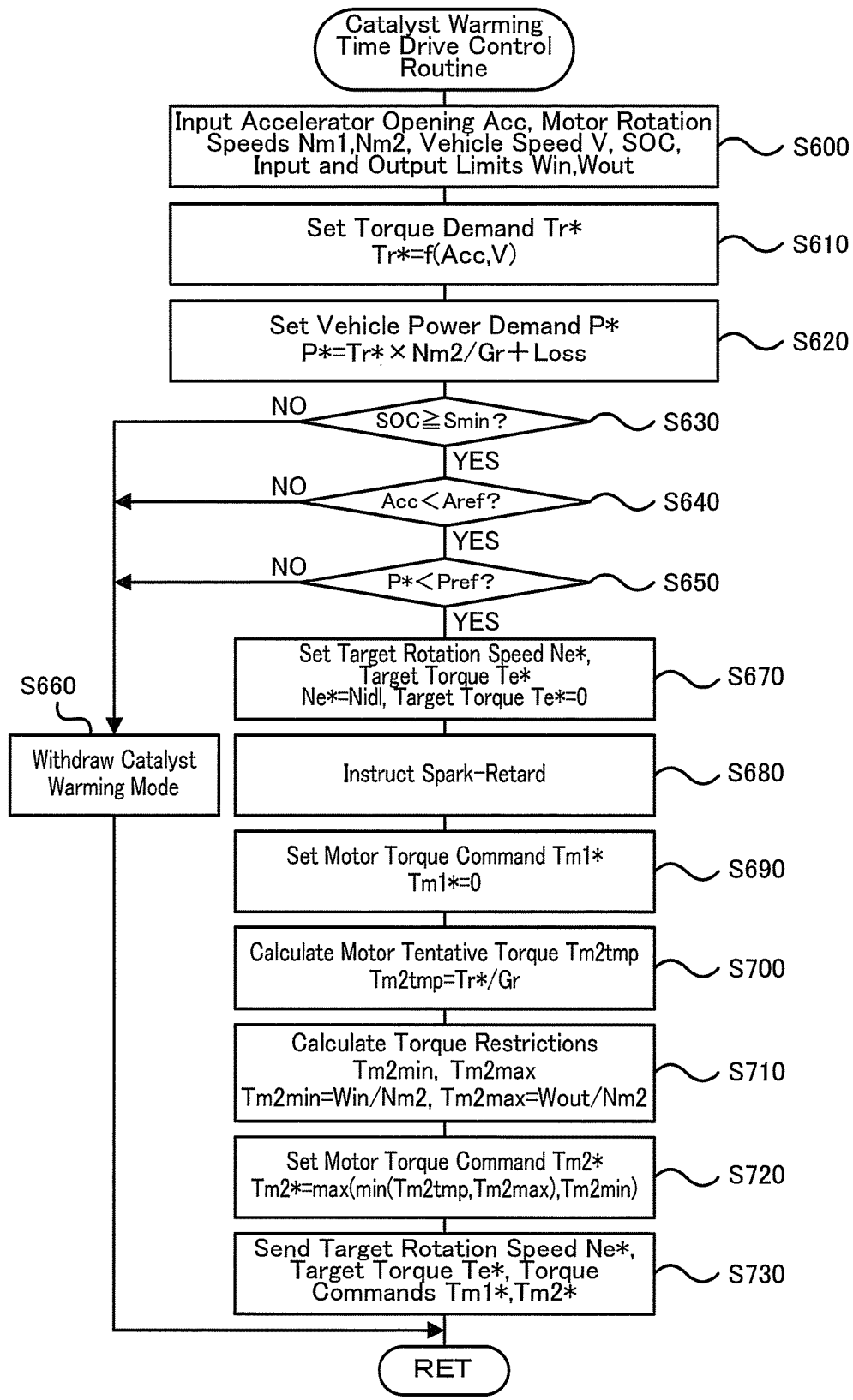
FIG. 10 is a flowchart showing a catalyst warming time drive control routine executed by a hybrid electronic control unit 70 in the embodiment.

The following description regards the drive control with each control mode set as described above. FIG. 9 is a flowchart showing a drive control routine executed by a hybrid electronic control unit 70 while the engine 22 is in operation. This routine is one example of the drive control routines executed when the normal mode or the low SOC control mode is set. FIG. 10 is a flowchart showing a catalyst warming time drive control routine executed by a hybrid electronic control unit 70 when the catalyst warming mode is set. As the other examples of the drive control routines executed when the normal mode or the low SOC mode is set, other than the drive control during the operation of the engine 22 shown in FIG. 9, there are a drive control for motor drive that the hybrid vehicle 20 is driven only with the output power from the motor MG2 during the operation stop of the engine 22 and a drive control for startup time that the hybrid vehicle 20 is driven during the startup operation of the engine 22 that has been stopped. The drive control for motor drive is control for outputting the torque demand Tr* set in the drive control routine of FIG. 9 from the motor MG2 within the range defined by the input limit Win and the output limit Wout of the battery 50, and the drive control for startup time is control that a torque for cranking the engine 22 is superimposed on the drive control for motor drive. Any of these drive controls are based on the drive control of FIG. 9 and does not constitute the core of the present invention, explanation about the both of the drive control for motor drive and the drive control for startup time are thus not given in the following description.

In the drive control routine according to the setting of the normal mode or the low SOC control mode, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the charge-discharge power demand Pb*, and the input limit Win and the output limit Wout of the battery 50 (step S400). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The charge-discharge power demand Pb* is set based on the charge power demand or the discharge power demand (see FIG. 8) in accordance with the managing center SOC* set based on the control mode and the state of charge (SOC) of the battery 50, and is input from the battery ECU 52 by communication. Namely, when the normal mode is set in the control mode setting routine of FIG. 5, the CPU 72 inputs the charge-discharge power demand Pb* obtained from the state of charge (SOC) of the battery 50 and a map indicated with the solid line of FIG. 8. When the low SOC control mode is set, the CPU 72 inputs the charge-discharge power demand Pb* obtained from the state of charge (SOC) and a map indicated with the broken line of FIG. 8. The input limit Win and the output limit Wout of the battery 50 are set based on the battery temperature Tb and the state of charge (SOC) of the battery 50 and are input from the battery ECU 52 by communication.

Figure 11:
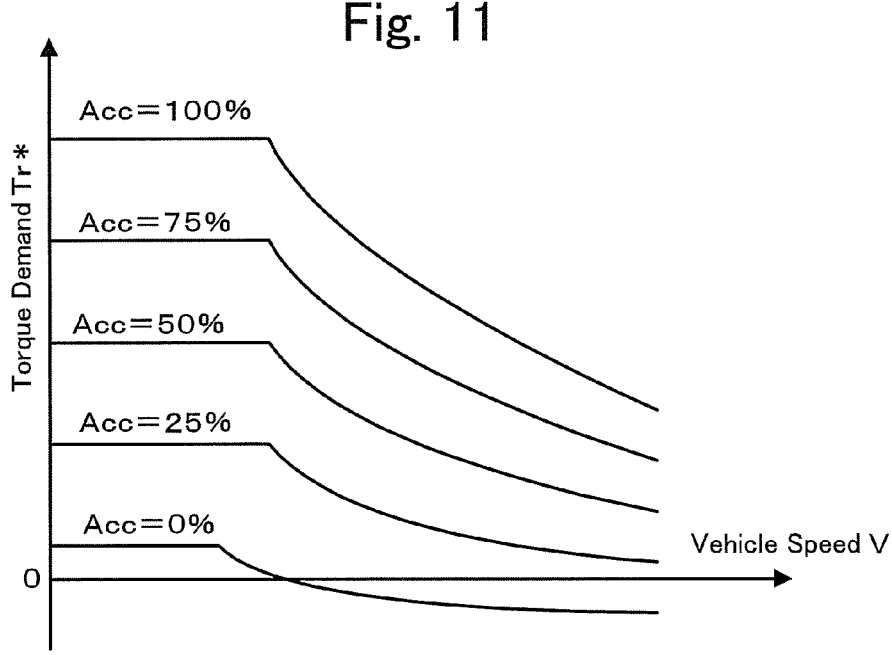
FIG. 11 shows one example of a torque demand setting map.

After the data input, the CPU 72 sets a torque demand Tr* to be output to the ring gear shaft 32a or the driveshaft linked with the drive wheels 63a and 63b as a torque required for the hybrid vehicle 20 based on the input accelerator opening Acc and the input vehicle speed V (step S410), and sets a power demand Pe* required for the engine 22 based on the set torque demand Tr* (step S420). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 11. The power demand Pe* is calculated as the sum of the product of the set torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 12:
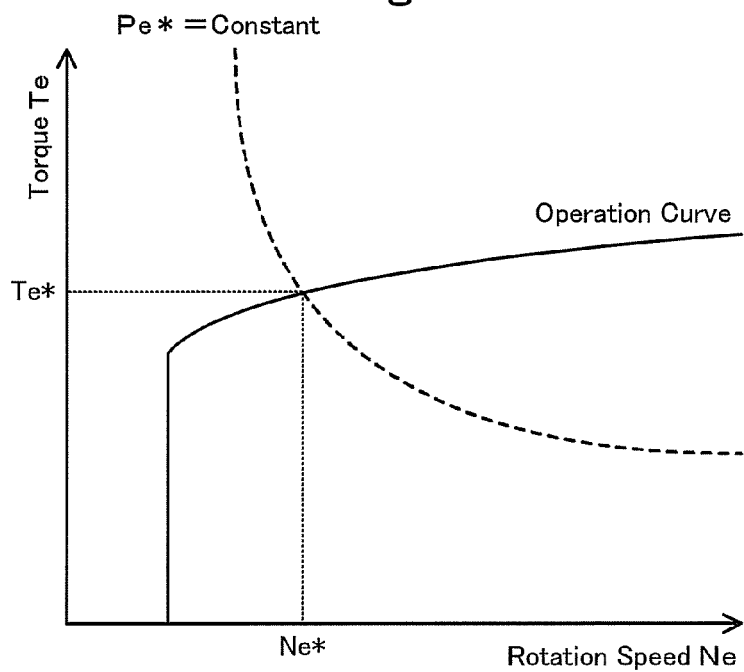
FIG. 12 shows an operation curve of the engine 22 used to set the target rotation speed Ne* and the target torque Te*.

A target rotation speed Ne* and a target torque Te* defining a target drive point of the engine 22 are then set, based on the set power demand Pe* of the engine 22 (step S430). In this embodiment, the target rotation speed Ne* and the target torque Te* are determined according to an operation curve of ensuring efficient operation of the engine 22 and a curve of the engine power demand Pe*. FIG. 12 shows an operation curve of the engine 22 used to set the target rotation speed Ne* and the target torque Te*. As clearly shown in FIG. 12, the target rotation speed Ne* and the target torque Te* are given as an intersection of the operation curve and a curve of constant power demand Pe* (=Ne*×Te*).

The CPU 72 subsequently calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a tentative torque Tm1tmp as a provisional value of torque to be output from the motor MG1 from the calculated target rotation speed Nm1* and the input rotation speed Nm1 of the motor MG1 according to Equation (2) given below (step S440):

$$Nm1^{*}=Ne^{*}(1+\rho)/\rho-Nm2/(Gr\cdot\rho) \quad (1)$$

$$Tm1tmp=\rho\cdot Te^{*}/(1+\rho)+k1(Nm1^{*}-Nm1)+k2\int(Nm1^{*}-Nm1)dt \quad (2)$$

Figure 13:
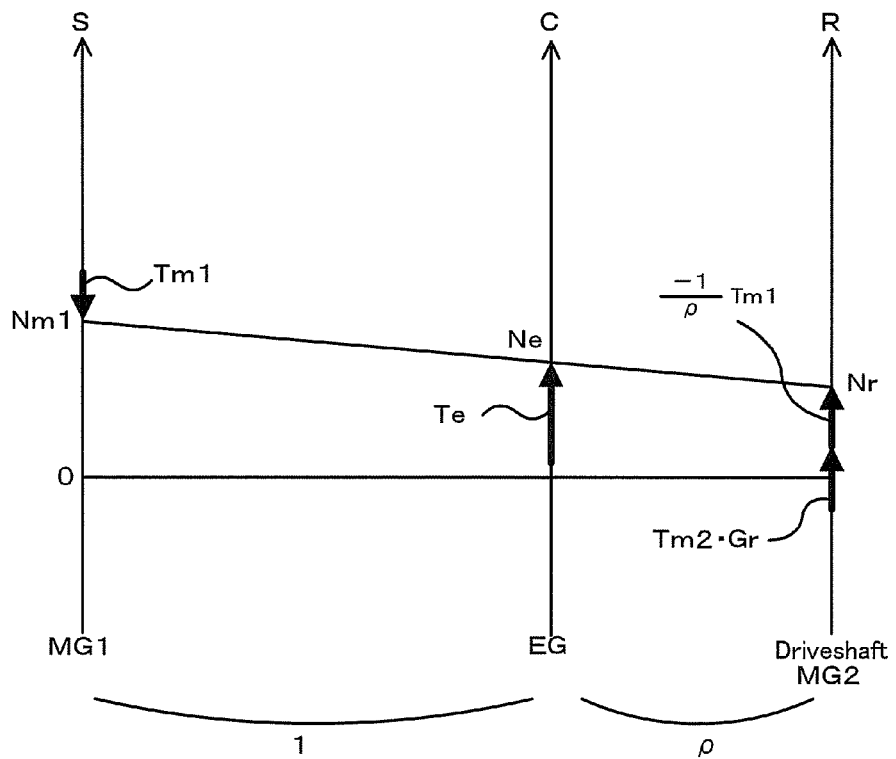
FIG. 13 is an alignment chart showing torque-rotation speed dynamics of the respective rotational elements included in the power distribution integration mechanism 30 during the drive of the hybrid vehicle 20 with output power of the engine 22.

Equation (1) is a dynamic relational expression of respective rotational elements included in the power distribution integration mechanism 30. FIG. 13 is an alignment chart showing torque-rotation speed dynamics of the respective rotational elements included in the power distribution integration mechanism 30 during the drive of the hybrid vehicle 20 with output power of the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

The CPU 72 then sets a lower torque restriction Tm1min and an upper torque restriction Tm1max as allowable minimum and maximum torques that may be output from the motor MG1 to satisfy both Expressions (3) and (4) given below (step S450), and sets a torque command Tm1* of the motor MG1 by limiting the set tentative torque Tm1tmp with the set lower torque restriction Tm1min and upper torque restriction Tm1max according to Equation (5) below (step S460):

$$0 \leq -Tm1/\rho + Tm2 \cdot Gr \leq Tr^* \quad (3)$$

$$Win \leq Tm1 \cdot Nm1 + Tm2 \cdot Nm2 \leq Wout \quad (4)$$

$$Tm1^* = \max(\min(Tm1tmp, Tm1\max), Tm1\min) \quad (5)$$

Figure 14:
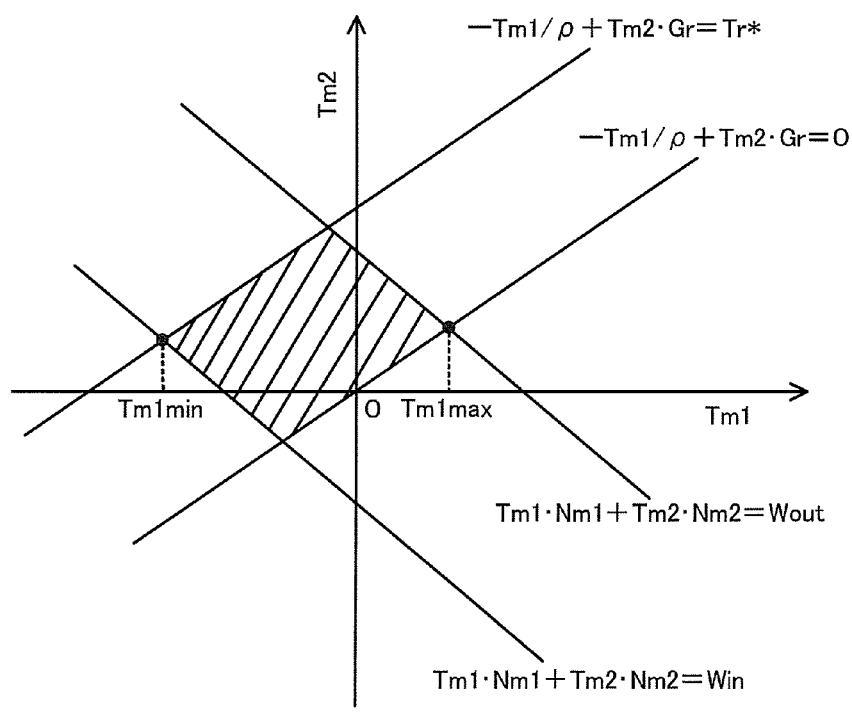
FIG. 14 shows one set of examples of the upper torque restriction Tm1max and the lower torque restriction Tm1min.

Expression (3) is a relational expression showing that the sum of the torques output from the motors MG1 and MG2 to the ring gear shaft 32a is within a range of 0 to the torque demand Tr*. Expression (4) is a relational expression showing that the sum of the electric powers input into and output from the motors MG1 and MG2 is in a range of the input limit Win and the output limit Wout of the battery 50. One set of examples of the upper torque restriction Tm1max and the lower torque restriction Tm1min is shown in FIG. 14. The upper torque restriction Tm1max and the lower torque restriction Tm1min are obtained as a maximum value and a minimum value of the torque command Tm1* in a hatched area.

The CPU 72 subsequently adds the result of division of the torque command Tm1* by the gear ratio ρ of the power distribution integration mechanism 30 to the torque demand Tr*, and specifies a tentative torque Tm2tmp as a provisional value of torque to be output from the motor MG2 by dividing the result of the addition by the gear ratio Gr of the reduction gear 35, according to Equation (6) given below (step S470):

$$Tm2tmp = (Tr^* + Tm1^*/\rho)/Gr \quad (6)$$

The CPU 72 subsequently calculates a lower torque restriction Tm2min and an upper torque restriction Tm2max as allowable minimum and maximum torques output from the motor MG2 according to Equations (7) and (8) given below (step S480):

$$Tm2\min = (Win - Tm1^* \cdot Nm1)/Nm2 \quad (7)$$

$$Tm2\max = (Wout - Tm1^* \cdot Nm1)/Nm2 \quad (8)$$

The lower torque restriction Tm2min and the upper torque restriction Tm2max are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then limits the specified tentative torque Tm2tmp by the lower torque restriction Tm2min and upper torque restriction Tm2max according to Equation (9) given below to set a torque command Tm2* of the motor MG2 (step S490):

$$Tm2^* = \max(\min(Tm2tmp, Tm2\max), Tm2\min) \quad (9)$$

Equation (6) given above is readily introduced from the alignment chart of FIG. 13.

After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S500) and terminates the drive control routine. In response to reception of the settings of the target rotation speed Ne* and the target torque Te*, the engine ECU 24 performs required controls including intake air flow regulation, fuel injection control, ignition control of the engine 22 to operate the engine 22 at the specific drive point defined by the combination of the target rotation speed Ne* and the target torque Te*. In response to reception of the settings of the torque commands Tm1* and Tm2*, the motor ECU 40 performs switching control of the inverter 41, 42 to drive the motor MG1 with the torque command Tm1* and the motor MG2 with the torque command Tm2*. The above control described enables to control the state of charge (SOC) to be within the range near the managing center SOC* and enables the torque demand Tr* to be within the range of the input limit Win and the output limit Wout of the battery 50 to be output to the ring gear shaft 32a or the driveshaft for driving the hybrid vehicle 20 while operating the engine 22 efficiently. Namely, when the normal mode is set in the control mode setting routine of FIG. 5, the state of charge (SOC) of the battery 50 is controlled to be within the range corresponding to the value S1 as the managing center SOC* and enables the torque demand Tr* to be within the range of the input limit Win and the output limit Wout of the battery 50 to be output to the ring gear shaft 32a for driving the hybrid vehicle 20 while operating the engine 22 efficiently. When the low SOC control mode is set in the control mode setting routine, the state of charge (SOC) of the battery 50 is controlled to be within the range corresponding to the smaller value S2 than the value S1 as the managing center SOC* and enables the torque demand Tr* to be within the range of the input limit Win and the output limit Wout of the battery 50 to be output to the ring gear shaft 32a for driving the hybrid vehicle 20 while operating the engine 22 efficiently. When the low SOC control mode is set, it is thus enabled to manage the state of charge (SOC) to be low and to control the engine 22 and the motors MG1 and MG2 with the enlarged absolute value of the input limit Win, achieving the enhanced energy efficiency as a result.

In the catalyst warming time drive control routine of FIG. 10 in accordance with the setting of the catalyst warming mode, the CPU 72 of the hybrid electronic control unit 70 inputs various data required for drive control, for example, the accelerator opening Acc, the vehicle speed V, the rotation speeds Nm1 and Nm2 of the motors MG1 and MG2, the state of charge (SOC) of the battery 50, and the input limit Win and the output limit Wout of the battery 50 (step S600). The CPU 72 then sets the torque demand Tr* to be output to the ring gear shaft 32a or the driveshaft based on the input accelerator opening Acc and vehicle speed V with the torque demand setting map of FIG. 11 (step S610), and sets a vehicle power demand P* as the sum of the product of the torque demand Tr* and the rotation speed Nr of the ring gear shaft 32a and the potential loss (step S620). The state of charge (SOC) of the battery 50 is obtained from the integrated value of the charge-discharge current Ib and input from the battery ECU 52 by communication.

The CPU 72 subsequently determines whether the state of charge (SOC) of the battery 50 is not less than a reference value Smin (step S630), whether the accelerator opening Acc is less than a reference value Aref (step S640), and whether vehicle power demand P* is less than a reference value Pref (step S650). The reference value Smin is set as a value larger than the state of charge (SOC) corresponding to an amount of electric power required for starting up the engine 22 next. For example, 20% or 30% is used as the reference value Smin. The reference value Aref is set as an accelerator opening that indicates a requirement to output power from the engine 22 in addition to outputting power from the motor MG2. For example, 50% or 60% is used as the reference value Aref. The reference value Pref is set as a slightly smaller value than the upper limit value of power that the discharge power from the battery 50 is able to cover, and is decided by, for example, the capability of the battery 50.

When the state of charge (SOC) of the battery 50 is less than the reference value Smin, the accelerator opening Acc is not less than the reference value Aref, or the vehicle power demand P* is not less than the reference value Pref, it is decided that outputting power from the engine 22 is necessary and the CPU 72 withdraws the setting of the catalyst warming mode (step S660). This routine is then terminated, and the hybrid vehicle 20 is driven and controlled by the drive control routine of FIG. 9.

When the state of charge (SOC) of the battery 50 is not less than the reference value Smin, the accelerator opening Acc is less than the reference value Aref, and the vehicle power demand P* is less than the reference value Pref, the CPU 72 sets the target rotation speed Ne* of the engine 22 to an idling rotation speed Nidl (for example, 800 rpm or 1000 rpm) and sets the target torque Te* to the value 0 (step S670). The CPU 72 then sends a control signal for instructing spark-retard so that the ignition timing of the engine 22 is delayed from the timing at the normal time (step S680). The reason why the spark-retard is performed is because more combustion energy is supplied to the downstream catalytic converter 134, that is, more combustion energy is used for warming the catalyst of the catalytic converter 134.

The CPU 72 subsequently sets the torque command Tm1* of the motor MG1 to the value 0 (step S690) and sets the tentative torque Tm2tmp and the lower and upper torque restriction Tm2min and Tm2max by substitution of the value 0 into the torque command Tm1* in the above Equations (6) to (8) (step S700, S710). The torque command Tm2* of the motor MG2 is set by limiting the tentative torque Tm2tmp with the lower and upper torque restriction Tm2min and Tm2max according to the Equation (9) (step S720).

Figure 15:
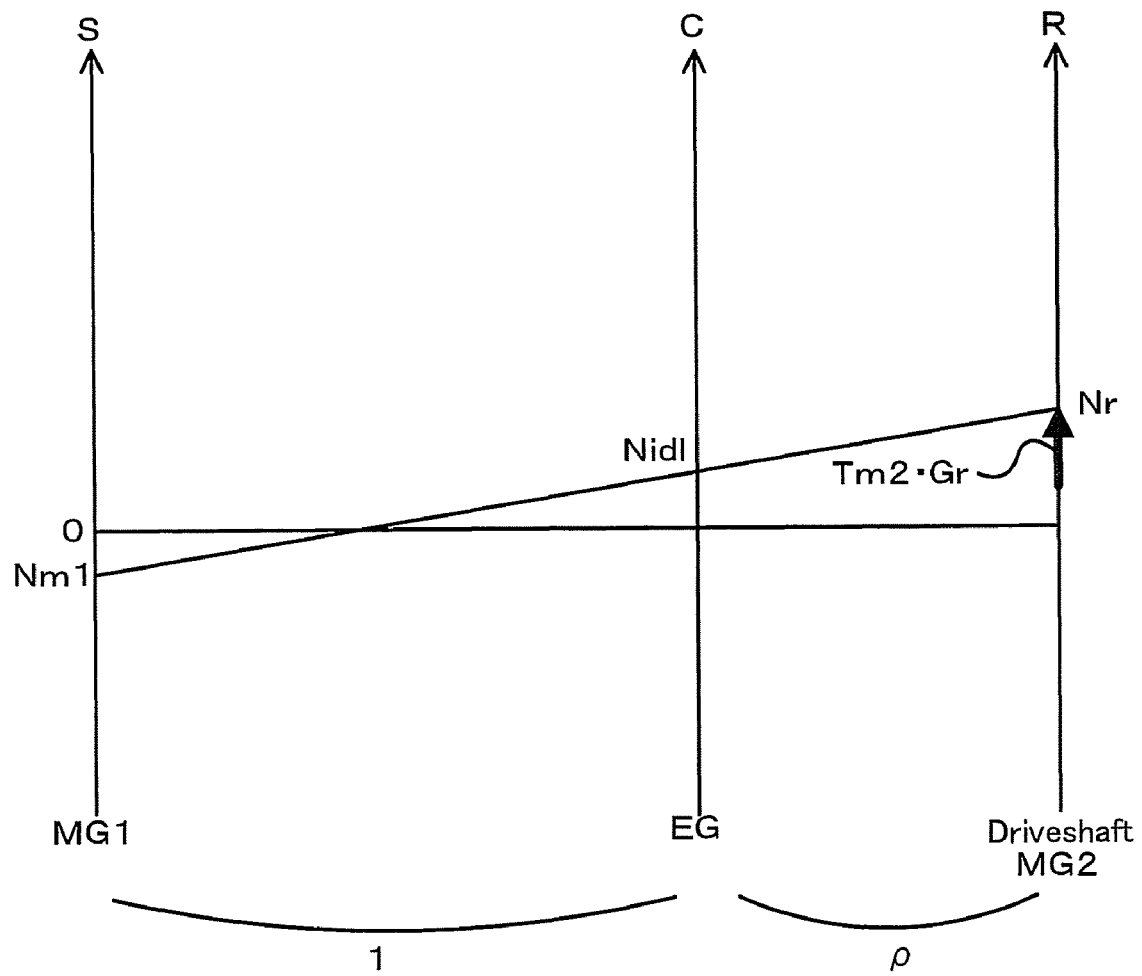
FIG. 15 is an alignment chart showing torque-rotation speed dynamics of the respective rotational elements included in the power distribution integration mechanism 30 during the drive of the hybrid vehicle 20 in the catalyst warming mode.

The CPU 72 then sends the settings of the target rotation speed Ne* and the target torque Te* of the engine 22 to the engine ECU 24 and the settings of the torque commands Tm1* and Tm2* of the motors MG1 and MG2 to the motor ECU 40 (step S730) and terminates the catalyst warming time drive control routine. In response to reception of the settings of the target rotation speed Ne* as the idling rotation speed Nidl and the target torque Te* as the value 0, the engine ECU 24 performs required controls of the engine 22 including intake air flow regulation, fuel injection control, and ignition control so that self sustained operation (no-load operation) of the engine 22 is performed at the idling rotation speed Nidl with the spark-retard state according to the control signal for the spark-retard received at step S680. In response to reception of the settings of the torque commands Tm1* and Tm2*, the motor ECU 40 performs switching control of the inverter 41, 42 to drive the motor MG1 with the torque command Tm1* set as the value 0 and the motor MG2 with the torque command Tm2*. The above control described enables to operate the engine 22 so as to accelerate warm-up of the catalyst of the catalytic converter 134 and enables the torque demand Tr* to be within the range of the input limit Win and the output limit Wout of the battery 50 to be output to the ring gear shaft 32a or the driveshaft for driving the hybrid vehicle 20. Namely, when the catalyst warming mode is set in the control mode setting routine of FIG. 5, the catalyst of the catalytic converter 134 is enabled to be warmed up because the hybrid vehicle 20 is driven by outputting the torque demand Tr* within the range of the input limit Win and the output limit Wout of the battery 50 to the ring gear shaft 32a while performing the no-load operation of the engine 22 rotating at its idling rotation speed Nidl with spark-retard state. FIG. 15 is an alignment chart showing torque-rotation speed dynamics of the respective rotational elements included in the power distribution integration mechanism 30 during the drive of the hybrid vehicle 20 in the catalyst warming mode.

In the hybrid vehicle 20 of the embodiment described above, when the low SOC control request is output and the catalyst warming request is not output, the charge-discharge power demand Pb* (charge power demand or discharge power demand) is set according to the managing center SOC* set as the smaller value S2 than the value S1 for the normal time and is used in the drive control. The state of charge (SOC) of the battery 50 is accordingly controlled to be relatively low and the absolute value of the input limit Win is enlarged. It is thus achieved that more of the generated power from the motors MG1 and MG2 is charged into the battery 50 and the energy efficiency is enhanced. As a matter of course, the hybrid vehicle 20 is driven by outputting a torque corresponding to the torque demand Tr* to the ring gear shaft 32a or the driveshaft. When the low SOC control request is not output and the catalyst warming request is output, the engine 22 is controlled to perform the self sustained operation (no-load operation) at the idling rotation speed Nidl with the spark-retard state. The catalyst of the catalytic converter 134 is thus warmed up rapidly, and the exhaust emission is prevented from becoming worse. Moreover, at either one of the time when the state of charge SOC) of the battery 50 is less than the reference value Smin, the time when the accelerator opening Acc is not less than the reference value Aref, or the time when the vehicle power demand Pb* is not less than the reference value Pref, the catalyst warming mode is withdrawn and the drive control in the normal mode is executed. The battery 50 is thus prevented from being over-discharged and the hybrid vehicle 20 is driven by outputting the torque and the power required by the driver. When the low SOC control request is output and the catalyst warming request is also output, the catalyst warming mode is set regardless of the low SOC control request and the engine 22 is controlled to perform the self sustained operation (no-load operation) at the idling rotation speed Nidl with the spark-retard state. The catalyst of the catalytic converter 134 is thus warmed up rapidly, and the exhaust emission is prevented from becoming worse.

In the hybrid vehicle 20 of the embodiment, as the catalyst warming time drive control, the engine 22 is controlled to perform the self sustained operation (no-load operation) at the idling rotation speed Nidl with the spark-retard state. This is not essential. The engine 22 may be controlled to perform the self sustained operation (no-load operation) at the idling rotation speed Nidl without the spark-retard state, and the engine 22 and the motor MG1 may be controlled so that the engine 22 performs a load operation outputting a little power at the idling rotation speed Nidl with the spark-retard state. The rotation speed of the engine 22 is not restricted to the idling rotation speed Nidl but may be any other rotation speed.

In the hybrid vehicle 20 of the embodiment, the low SOC control request is output when the battery temperature Tb is less than the reference value Tref2 that is set as a temperature where the absolute value of the input limit Win becomes small and the cooling water temperature Tw is less than the reference value Tref3 that is set as a temperature where it is able to be determined that the engine 22 is not warmed up. The cooling water temperature Tw is not essential. The low SOC control request may be output when the battery temperature Tb is less than the reference value Tref2 regardless of the cooling water temperature Tw of the engine 22.

In the hybrid vehicle 20 of the embodiment, the battery 50 is a lithium-ion battery. However, the battery 50 may be any other secondary battery than the lithium-ion battery, for example, a nickel metal hydride battery and a lead acid battery.

In the hybrid vehicle 20 of the embodiment, the torque command Tm1* of the motor MG1 is set by obtaining the upper and lower torque restrictions Tm1max and Tm1min which satisfy both Expressions (3) and (4) described above for limiting the tentative torque Tm1tmp of the motor MG1, and the torque command Tm2* of the motor MG2 is set by obtaining the upper and lower torque restrictions Tm2max and Tm2min according to Equations (7) and (8) described above. In one modified example, the torque command Tm1* of the motor MG1 may be set equivalent to the tentative torque Tm1tmp without any limitations by the upper and lower torque restrictions Tm1max and Tm1min which satisfies both Expressions (3) and (4), and the torque command Tm2* may be set by obtaining the upper and lower torque restrictions Tm2max and Tm2min according to Equations (7) and (8) using the set the torque command Tm1* of the motor MG1.

In the hybrid vehicle 20 of the embodiment, the motor MG2 is attached to the ring gear shaft 32a or the driveshaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 16:
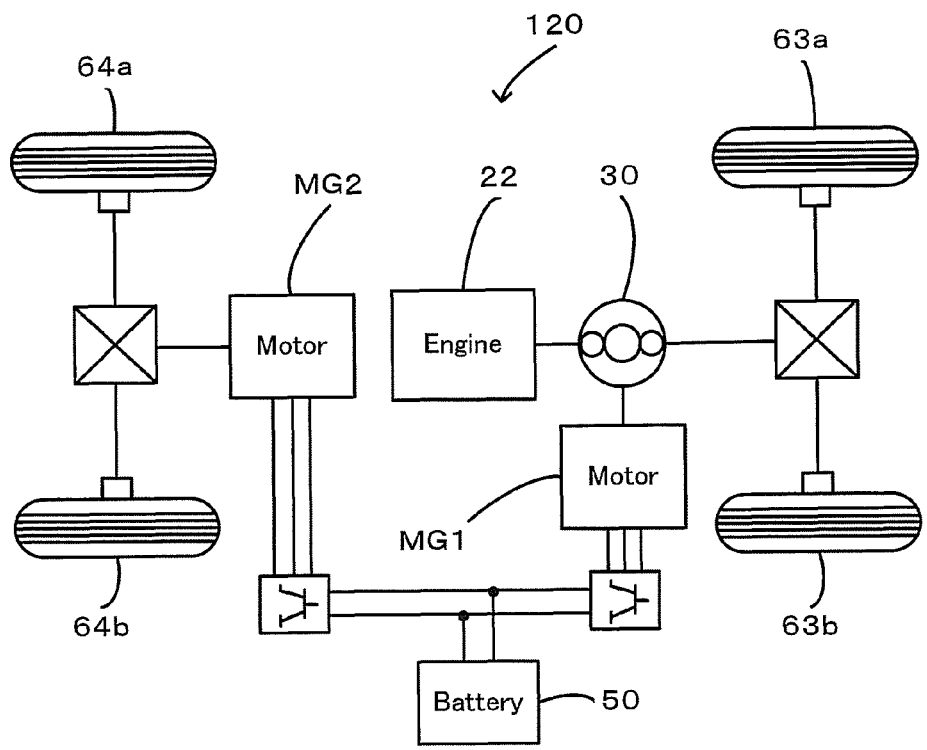
FIG. 16 is a schematic illustration of the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 16. In the hybrid vehicle 120 of FIG. 16, the power of the motor MG2 is connected to another axle (an axle linked with wheels 64a and 64b) that is different from the axle connecting with the ring gear shaft 32a (the axle linked with the drive wheels 63a and 63b).

Figure 17:
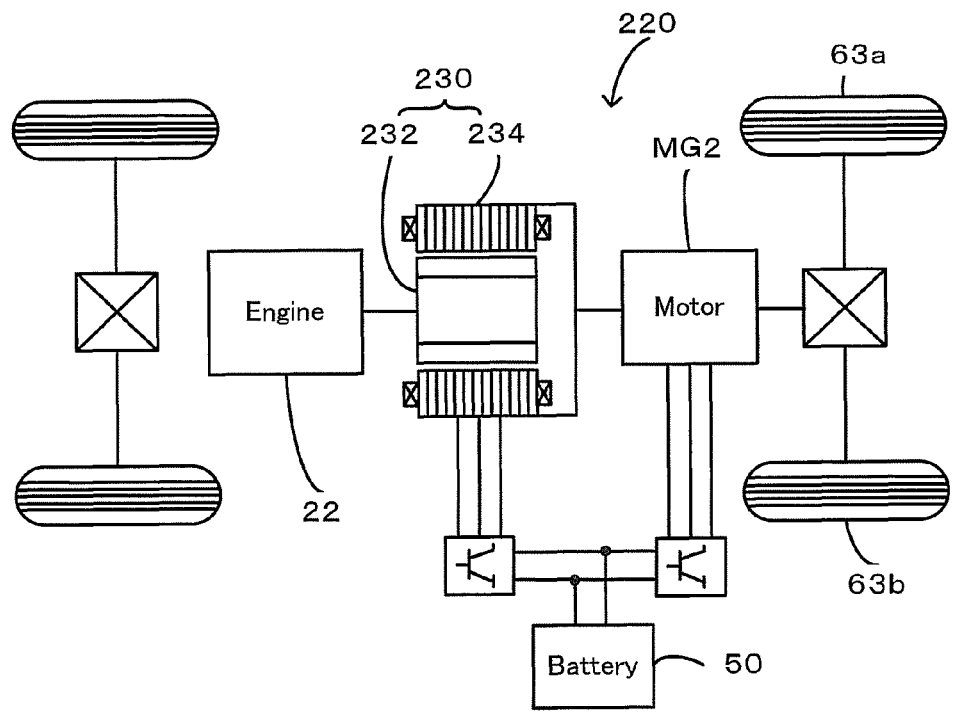
FIG. 17 is a schematic illustration of the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 17. The hybrid vehicle 220 of FIG. 17 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The type of the hybrid vehicle is not restricted to the parallel hybrid described above, but any other type of hybrid vehicles having an engine with an exhaust system that an exhaust purifying device having a catalyst for purifying exhaust is attached, a generator that generates electric power using output power from the engine, a motor that is capable of outputting power for driving the vehicle, and a battery that supplies and receives electric power to and from the generator and the motor, for example, series hybrid.

The embodiment and its modified examples regard application of the invention to the hybrid vehicles. The principle of the invention may be actualized by diversity of other applications, for example, vehicles other than motor vehicles as well as a control method of such a vehicle.

The primary elements in the embodiment and its modified examples are mapped to the primary constituents in the claims of the invention as described below. The engine 22 with an exhaust system that the catalytic converter 134 having a catalyst for purifying exhaust is attached in the embodiment corresponds to the 'internal combustion engine' in the claims of the invention. The motor MG1 that is connected to the engine 22 via the power distribution integration mechanism 30 and generates electric power using output power from the engine 22 in the embodiment corresponds to the 'generator' in the claims of the invention. The motor MG2 that is connected to the driving wheels 63a and 63b via the differential gear 62 and the ring gear shaft 32a in the embodiment corresponds to the 'motor' in the claims of the invention. The battery 50 as a lithium-ion battery that supplies and receives electric power to and from the motors MG1 and MG2 in the embodiment corresponds to the 'accumulator' in the claims of the invention. The hybrid electronic control unit 70 executing the processing of step S410 in the drive control routine of FIG. 9 and the processing of step S610 in the catalyst warming time dive control routine of FIG. 10 to set the torque demand Tr* based on the accelerator opening Acc and the vehicle speed V corresponds to the 'driving power demand setting module' in the claims of the invention. The battery ECU 52 executing the low SOC control request outputting routine of FIG. 7 to output the low SOC control request when the battery temperature Tb is less than the reference value Tref2 that is set as a temperature where the absolute value of the input limit Win becomes small and the cooling water temperature Tw is less than the reference value Tref3 that is set as a temperature where it is able to be determined that the engine 22 is not warmed up corresponds to the 'low charge state control requesting module' in the claims of the invention. The engine ECU 24 executing the catalyst warming request outputting routine of FIG. 6 to output the catalyst warming request when the catalyst temperature Tc in the catalytic converter 134 is less than the reference value Tref1 that is set as a temperature lower than the lower limit of a temperature range where the catalyst is activated corresponds to the 'catalyst warming acceleration control requesting module' in the claims of the invention. The combination of the hybrid electronic control unit 70, the engine ECU 24 controlling the engine 22 based on the received target rotation speed Ne*, target torque Te* and the control signal for the spark-retard, and the motor ECU 40 controlling the motors MG1 and MG2 based on the received torque commands Tm1* and Tm2* in the embodiment corresponds to the 'controller' in the claims of the invention. When the low SOC control request is output and the catalyst warming request is not output, the hybrid electronic control unit 70 executes the processing of steps S110, S120, S150 and S160 in the control mode setting routine of FIG. 5 to set the low SOC control mode as a control mode and to set the charge-discharge power demand Pb* (charge power demand or discharge power demand) according to the managing center SOC*, as the smaller value S2 than the value S1 at the normal time, of the state of charge (SOC) of the battery 50, and executes the processing of steps S420 to S500 in the drive control routine of FIG. 9 to set the target rotation speed Ne*, target torque Te*, and the torque commands Tm1* and Tm2* of the motors MG1 and MG2 using the charge-discharge power demand Pb* so that the torque demand Tr* is output to the ring gear shaft 32a or driveshaft within the range of the input limit Win and the output limit Wout of the battery 50, and to send the settings to the engine ECU 24 and the motor ECU 40. When the low SOC control request is not output and the catalyst warming request is output, the hybrid electronic control unit 70 executes the processing of steps S110, S120 and S170 in the control mode setting routine of FIG. 5 to set the catalyst warming mode as a control mode and executes the processing of steps S620 to S730 in the drive control routine of FIG. 10 to set the target rotation speed Ne*, target torque Te*, and the torque commands Tm1* and Tm2* of the motors MG1 and MG2 so that the engine 22 performs the self sustained operation (no-load operation) at the idling rotation speed Nidl with the spark-retard and the torque demand Tr* is output to the ring gear shaft 32a or driveshaft within the range of the input limit Win and the output limit Wout of the battery 50, and to send the settings to the engine ECU 24 and the motor ECU 40. When the low SOC control request is output and the catalyst warming request is also output, the hybrid electronic control unit 70 executes the processing of steps S110, S120 and S170 in the control mode setting routine of FIG. 5 to set the catalyst warming mode regardless of the low SOC control request and executes the processing of steps S620 to S730 in the drive control routine of FIG. 10 to set the target rotation speed Ne*, target torque Te*, and the torque commands Tm1* and Tm2* of the motors MG1 and MG2 so that the engine 22 performs the self sustained operation (no-load operation) at the idling rotation speed Nidl with the spark-retard and the torque demand Tr* is output to the ring gear shaft 32a or driveshaft within the range of the input limit Win and the output limit Wout of the battery 50, and to send the settings to the engine ECU 24 and the motor ECU 40.

The 'internal combustion engine' is not restricted to the internal combustion engine designed to consume a hydrocarbon fuel, such as gasoline or light oil, and thereby output power, but may be any other type with an exhaust system that an exhaust purifying device having an exhaust purifying catalyst for purifying exhaust is attached, for example, hydrogen engine. The 'generator' is not restricted to the motor MG1 constructed as a synchronous motor generator that is connected to the engine 22 via the power distribution integration mechanism 30 and generates electric power using output power from the engine 22, but may be any other type generates electric power using output power from the internal combustion engine, for example, a generator that is directly attached to a crankshaft of the engine, and an induction motor. The 'motor' is not restricted to the motor MG2 constructed as a synchronous motor generator but may be any type of motor capable of outputting power for driving the vehicle, for example, an induction motor. The 'accumulator' is not restricted to the battery 50 as a lithium-ion battery that supplies and receives electric power to and from the motors MG1 and MG2 but may be any other design that supplies and receives electric power to and from the generator and the motor, for example, a nickel metal hydride battery and a lead acid battery. The 'driving power demand setting module' is not restricted to the arrangement of setting the torque demand Tr* based on the accelerator opening Acc and the vehicle speed V but may be any other arrangement of setting a driving power demand required for driving the vehicle, for example, an arrangement of setting the torque demand based only on the accelerator opening Acc or an arrangement of setting the torque demand based on a location of the vehicle on a preset drive route. The 'low charge state control requesting module' is not restricted to the arrangement of outputting the low SOC control request when the battery temperature Tb is less than the reference value Tref2 and the cooling water temperature Tw is less than the reference value Tref3, but may be any other arrangement of making a request for low charge state control when at least a temperature of the accumulator is less than a first temperature, the low charge state control being control for managing a stored amount of electricity in the accumulator using a stored amount center smaller than the stored amount center used when the temperature of the accumulator is not less than the first temperature, the stored amount center being a center of a managing range of the stored amount of electricity in the accumulator, for example, the low SOC control request may be output when the battery temperature Tb of the battery 50 is less than the reference value Tref2 regardless of the cooling water temperature Tw of the engine 22. The 'catalyst warming acceleration control requesting module' is not restricted to the arrangement of outputting the catalyst warming request when the catalyst temperature Tc in the catalytic converter 134 is less than the reference value Tref1, but may any other arrangement of making a request for catalyst warming acceleration control when at least a temperature of the exhaust purifying catalyst is less than a second temperature, the catalyst warming acceleration control being control for accelerating warm-up of the exhaust purifying catalyst. The 'controller' is not restricted to the combination of the hybrid electronic control unit 70 with the engine ECU 24 and the motor ECU 40 but may be actualized by a single electronic control unit. The 'controller' is not restricted to the arrangement of controlling the engine 22 and the motors MG1 and MG2, when the low SOC control request is output and the catalyst warming request is not output, by setting the low SOC control mode as a control mode, setting the charge-discharge power demand Pb* (charge power demand or discharge power demand) according to the managing center SOC*, as the smaller value S2 than the value S1 at the normal time, of the state of charge (SOC) of the battery 50, and setting the target rotation speed Ne*, target torque Te*, and the torque commands Tm1* and Tm2* of the motors MG1 and MG2 using the charge-discharge power demand Pb* so that the torque demand Tr* is output to the ring gear shaft 32a or driveshaft within the range of the input limit Win and the output limit Wout of the battery 50, controlling the engine 22 and the motors MG1 and MG2, when the low SOC control request is not output and the catalyst warming request is output, by setting the catalyst warming mode as a control mode, and setting the target rotation speed Ne*, target torque Te*, and the torque commands Tm1* and Tm2* of the motors MG1 and MG2 so that the engine 22 performs the self sustained operation (no-load operation) at the idling rotation speed Nidl with the spark-retard and the torque demand Tr* is output to the ring gear shaft 32a or driveshaft within the range of the input limit Win and the output limit Wout of the battery 50, and controlling the engine 22 and the motors MG1 and MG2, when the low SOC control request is output and the catalyst warming request is also output, by setting the catalyst warming mode regardless of the low SOC control request and setting the target rotation speed Ne*, target torque Te*, and the torque commands Tm1* and Tm2* of the motors MG1 and MG2 so that the engine 22 performs the self sustained operation (no-load operation) at the idling rotation speed Nidl with the spark-retard and the torque demand Tr* is output to the ring gear shaft 32a or driveshaft within the range of the input limit Win and the output limit Wout of the battery 50. But the 'controller' may be any other arrangement of, when the request for the low charge state control is made and the request for the catalyst warming acceleration control is not made, controlling the internal combustion engine, the generator, and the motor so that the stored amount of electricity in the accumulator is managed by the low charge state control and the vehicle is driven with a driving power corresponding to the set driving power demand, when the request for the low charge state control is not made and the request for the catalyst warming acceleration control is made, the controller controlling the internal combustion engine, the generator, and the motor so that the exhaust purifying catalyst is warmed up by the catalyst warming acceleration control and the vehicle is driven with the driving power corresponding to the set driving power demand, and when the request for the low charge state control is made and the request for the catalyst warming acceleration control is also made, the controller controlling the internal combustion engine, the generator, and the motor so that the exhaust purifying catalyst is warmed up by the catalyst warming acceleration control regardless of the request for the low charge state control and the vehicle is driven with the driving power corresponding to the set driving power demand. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the vehicles.

The invention claimed is:

1. A vehicle, comprising:
    an internal combustion engine with an exhaust system that an exhaust purification device having an exhaust purifying catalyst for purifying exhaust is attached;
    a generator that generates electric power using output power from the internal combustion engine;
    a motor that is capable of outputting power for driving the vehicle;
    an accumulator that supplies and receives electric power to and from the generator and the motor;
    a driving power demand setting module that sets a driving power demand required for driving the vehicle;
    a low charge state control requesting module that makes a request for low charge state control when at least a temperature of the accumulator is less than a first temperature, the low charge state control being control for managing a stored amount of electricity in the accumulator using a stored amount center smaller than the stored amount center used when the temperature of the accumulator is not less than the first temperature, the stored amount center being a center of a managing range of the stored amount of electricity in the accumulator;
    a catalyst warming acceleration control requesting module that makes a request for catalyst warming acceleration control when at least a temperature of the exhaust purifying catalyst is less than a second temperature, the catalyst warming acceleration control being control for accelerating warm-up of the exhaust purifying catalyst; and
    a controller configured to, when the request for the low charge state control is made and the request for the catalyst warming acceleration control is not made, control the internal combustion engine, the generator, and the motor so that the stored amount of electricity in the accumulator is managed by the low charge state control and the vehicle is driven with a driving power corresponding to the set driving power demand,
    when the request for the low charge state control is not made and the request for the catalyst warming acceleration control is made, the controller controlling the internal combustion engine, the generator, and the motor so that the exhaust purifying catalyst is warmed up by the catalyst warming acceleration control and the vehicle is driven with the driving power corresponding to the set driving power demand, and
    when the request for the low charge state control is made and the request for the catalyst warming acceleration control is also made, the controller controlling the internal combustion engine, the generator, and the motor so that the exhaust purifying catalyst is warmed up by the catalyst warming acceleration control regardless of the request for the low charge state control and the vehicle is driven with the driving power corresponding to the set driving power demand.

2. The vehicle in accordance with claim 1, wherein the catalyst warming acceleration control is control that no load operation of the internal combustion engine is performed with delayed ignition timing from the ignition timing during performance of a load operation of the internal combustion engine.

3. The vehicle in accordance with claim 1, wherein the low charge state control requesting module does not make the request for the low charge state control when a temperature of cooling water of the internal combustion engine is not less than a third temperature regardless of the temperature of the accumulator being less than the first temperature.

4. The vehicle in accordance with claim 1, wherein the accumulator is a lithium-ion battery.

5. A control method of the vehicle, the vehicle having: an internal combustion engine with an exhaust system that an exhaust purification device having an exhaust purifying catalyst for purifying exhaust is attached; a generator that generates electric power using output power from the internal combustion engine; a motor that is capable of outputting power for driving the vehicle; and an accumulator that supplies and receives electric power to and from the generator and the motor, the control method comprising the steps of:
    (a) making a request for low charge state control when at least a temperature of the accumulator is less than a first temperature, the low charge state control being control for managing a stored amount of electricity in the accumulator using a stored amount center smaller than the stored amount center used when the temperature of the accumulator is not less than the first temperature, the stored amount center being a center of a managing range of the stored amount of electricity in the accumulator, and
    making a request for catalyst warming acceleration control when at least a temperature of the exhaust purifying catalyst is less than a second temperature, the catalyst warming acceleration control being control for accelerating warm-up of the exhaust purifying catalyst; and
    (b) when the request for the low charge state control is made and the request for the catalyst warming acceleration control is not made, controlling the internal combustion engine, the generator, and the motor so that the stored amount of electricity in the accumulator is managed by the low charge state control and the vehicle is driven with a driving power corresponding to a driving power demand required for driving the vehicle,
    when the request for the low charge state control is not made and the request for the catalyst warming acceleration control is made, controlling the internal combustion engine, the generator, and the motor so that the exhaust purifying catalyst is warmed up by the catalyst warming acceleration control and the vehicle is driven with the driving power corresponding to the driving power demand, and when the request for the low charge state control is made and the request for the catalyst warming acceleration control is also made, controlling the internal combustion engine, the generator, and the motor so that the exhaust purifying catalyst is warmed up by the catalyst warming acceleration control regardless of the request for low charge state control and the vehicle is driven with the driving power corresponding to the driving power demand.

6. The control method of the vehicle in accordance with claim 5, wherein the catalyst warming acceleration control is control that no load operation of the internal combustion engine is performed with delayed ignition timing from the ignition timing during performance of a load operation of the internal combustion engine.

7. The control method of the vehicle in accordance with claim 5, wherein the step (a) does not make the request for the low charge state control when a temperature of cooling water of the internal combustion engine is not less than a third temperature regardless of the temperature of the accumulator being less than the first temperature.

8. The control method of the vehicle in accordance with claim 5, wherein the accumulator is a lithium-ion battery.

* * * * *